UNITED STATES PATENT OFFICE.

FRANZ HOFMANN, OF LEIPSIC, ASSIGNOR, BY MESNE ASSIGNMENTS, TO CONRAD WARNECKE, SR., OF HAMBURG, AND THE FIRM OF M. MEINERT, OF LEIPSIC, GERMANY.

IMPROVEMENT IN PROCESSES FOR PRESERVING MEAT.

Specification forming part of Letters Patent No. 219,725, dated September 16, 1879; application filed December 2, 1878; patented in Belgium, August 12, 1878; patented in France, August 22, 1878; patented in Austria, September 6, 1878.

*To all whom it may concern:*

Be it known that I, FRANZ HOFMANN, of Leipsic, in the German Empire, have invented a new and Improved Process of Preserving Meat, which is fully set forth and described in the following specification.

The present invention relates to an improved process of preserving meat and obtaining meat-powder, as will be hereinafter more fully described.

In carrying out my process I proceed as follows, viz: The fresh meat, after it has been freed from bone and as far as possible from fatty matters, is cut into pieces. These pieces of meat are then salted with finely-powdered cooking-salt, the proportion of salt being never less than two per cent. and never more than three per cent. of the weight of the fresh meat. The use of this determined quantity of salt is to cause the product or meat-powder to contain a corresponding quantity of salt for the following objects: In order to give to the meat-powder in a dried state, in contradistinction to fresh meat, the highest possible power of resisting decay, and for this reason enable the meat-powder to be maintained in a high state of preservation, and fresh and palatable even when exposed to varying degrees of temperature and when packed in simple paper integuments or coverings. My meat-powder being almost entirely devoid of moisture, the shrinkage and toughness incidental to meat-powder prepared and salted in the ordinary manner cannot take place. The salt in my process exerts its preserving action only upon the easily-decomposable or nitrogenous matters and fats of the meat. The use of a determined quantity of salt will also obviate the danger of obtaining a meat-powder containing a too large percentage of salt, rendering it unpalatable for this reason, my product, on the contrary, being pleasant to the taste, and serving, also, by the presence of the salt therein, as a spice or condiment for the articles of food in connection with which it may be used.

It has been found by long experience that the above results are only achieved by the use of a determined quantity of salt, as specified. The salt is used in a finely-pulverized state, as it can in this condition be more uniformly distributed over the meat, the loss in transportation and salting of the meat being also less than if coarse salt were used.

After the meat has been cut into pieces and salted, care being taken that these operations are performed as speedily as possible, the meat is laid on crates or hurdles, and the latter are placed in proper drying-chambers adapted for the reception thereof. These chambers should be as capacious as possible, and the meat, after being placed therein, is first exposed to the action of a current of warm air of a temperature varying from 50° to 60° Celsius, the degree of heat never exceeding 60° Celsius and never being less than 50°. The meat should be exposed to this warm-air current for about eight to twelve hours, according to the meteorological condition of the air, and a lively circulation or passage of the air should be maintained by the use of blowers or ventilators. The air used is also impregnated with vapors of bisulphide of carbon, ($CS_2$). This impregnation is preferably performed in the following manner: Over the openings giving inlet to the warm air into the drying-chamber are arranged finely-perforated or foraminous receptacles, containing cotton, linen, or any other absorbent material.

Vessels containing liquid bisulphide of carbon are so arranged in respect to these receptacles of absorbent material that the aforesaid liquid is caused to drop upon the latter, and is vaporized by the incoming air.

The motion and temperature of the air determine the quantity of the bisulphide of carbon which is to be vaporized. The supply of the latter is cut off entirely or lessened when the air in the drying-chamber is impregnated with the vapors to such a degree that the workmen engaged in the drying-chambers cannot remain therein without being troubled by the presence of such vapors. The vaporization of the bisulphide of carbon is also so regulated, or it is continued only so long until the air in the drying-chamber is free from contaminating influences, as germs, &c.

It may be observed that the vapors of bisulphide of carbon are used for the following purposes, viz: In order to expel insects, and therefore prevent them from depositing their eggs on the moist fresh meat, and, furthermore, to increase the drying action of the warm air, as the vapors of bisulphide of carbon have also a desiccating influence upon the meat.

A meat-powder prepared from meat treated in the above manner is totally devoid of the taste and smell of bisulphide of carbon.

The above may be termed the "preliminary" or "preparatory" steps of my process. Before describing the final steps thereof it is proper to make a brief mention of the state of the art to which my process pertains.

It is well known that meat has been dried by natural, as well as artificial, heat. All known processes of preserving meat based upon the drying action of air have for their aim the desiccation of the meat at a temperature of less than 140° Fahrenheit. A patent granted in England to Hassall in the year 1866, No. 483, and the United States patent of Endemann, granted May 31, 1870, are instances of processes in which meat, after having been partially dried, is reduced to a pulverulent form. It is well known that the coagulation of albumen commences at 140° Fahrenheit, and in both of the cases referred to it is proposed to pulverize the meat after it has been only partially dried. Hassall proposes to dry the meat-powder by subjecting it to a temperature of 160° Fahrenheit, and, in order to prepare the fibrous residue of meat left after the first pulverization for reduction in the same manner, this stringy or fibrous meat is subjected to a degree of heat above the coagulating-point of albumen.

If fresh meat is exposed to a greater degree than 140° Fahrenheit it will shrink very rapidly, and will lose the property of again swelling up when placed in water. It will also become almost tasteless, and, in many instances, sour, and for this latter reason not easily digestible. In all meat-powders prepared according to existing processes in which the drying action takes place at a temperature of less than 140° Fahrenheit the objectionable result arises that such powders will easily absorb water from the surrounding atmosphere, and will again become moist. It will be apparent that when this result takes place decomposition can easily set in, or, in other words, the meat-powder cannot be maintained in a perfect state of preservation.

My process, founded on experiments performed during the past ten years, has for its object to combine the advantages of both temperatures, low and high, and at the same time avoid the disadvantages of the same incidental to their independent use. After the meat has been exposed to the action of a current of air heated to a temperature varying from 50° to 60° Celsius or centigrade for a time ranging from eight to twelve hours, it may be said that this completes the preliminary drying process.

It will be found that meat treated in this manner still possesses the taste of fresh meat, and that the extractive materials and meat-salts have not been removed; furthermore, the meat has not shrunk much. So soon as the meat, partially dried in the above manner, exhibits a leather-like surface crust several millimeters thick it is capable of being subjected to the action of a temperature of 90° to 100° Celsius without further shrinkage or change of its physical and chemical properties.

In order to perform this second and final drying process the meat is taken from the larger preliminary drying-chambers, and is placed on hurdles or shelves in a close drying-chamber, into which is admitted a current of hot air of a temperature varying from 90° to 100° Celsius, this air-current being free of all chemical vapors. The meat is permitted to remain in this drying-chamber until it is absolutely dry—say, for about twelve hours—and is then in condition to be ground or pulverized. This pulverization can be performed in any suitable mill.

The resultant of the entire process above described is a meat-powder, which is not liable to be affected to any perceptible or injurious extent by atmospheric or hygrometrical influences, possessing also in a high degree the nutritive, palatable, and other inherent qualities of fresh meat.

The meat after it has been pulverized may be put for transportation and use in packages of paper and cloth or other materials, it being not necessary to pack it in hermetically-sealed vessels.

For facilitating transportation, saving space, and making the handling of the meat-powder more convenient than if put up in a loose state it may be pressed into tablets or blocks. I may also put up the meat-powder with leguminous and farinaceous substances.

I desire it to be understood that meat-powder prepared according to my process may be used for all purposes where meat can be used in the preparation of articles of food.

I do not claim as new the process of drying minced meat at a temperature of 140° or below the same, then pulverizing the product, and finally subjecting the powdered meat to a temperature of 160° Fahrenheit. This forms no part of my invention.

Having thus described my invention, I claim as new—

The process of preserving meat, consisting of the following steps successively performed, viz: exposing meat treated with a determined quantity of salt to the action of a current of air heated to a temperature of 50° to 60° Celsius and impregnated with vapors of bisulphide of carbon; secondly, subjecting the meat to the drying action of a current of air of temperature varying from 90° to 100° Celsius until it is absolutely dry; and, thirdly, pulverizing the meat, as and for the purpose set forth.

In testimony whereof I have signed this specification in the presence of two subscribing witnesses.

PROF. F. HOFMANN.

Witnesses:
MAX GREBEL, *Architect*.
ALWIN TRETHAR, *Uhrenfabricant*.